FREQUENCY SHIFT TELEGRAPH RECEIVER
Filed Oct. 8, 1951 2 Sheets-Sheet 1
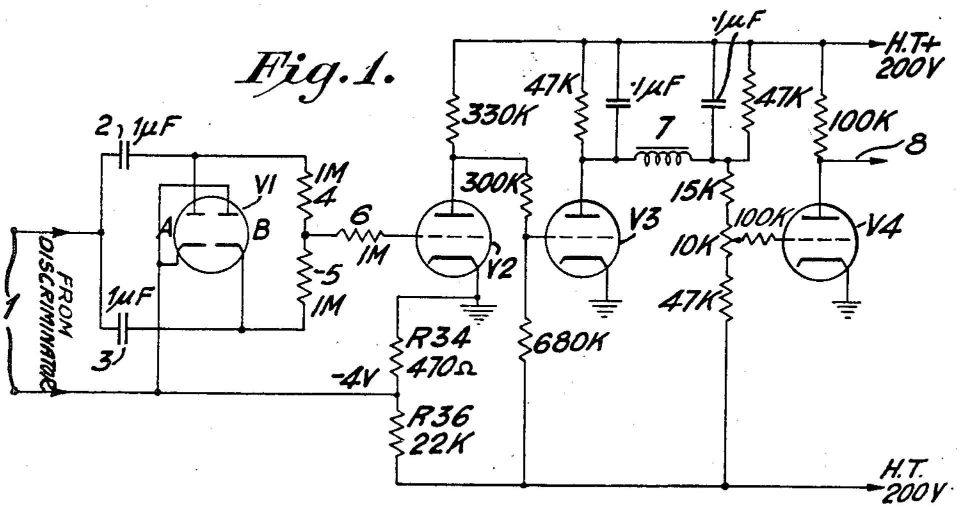
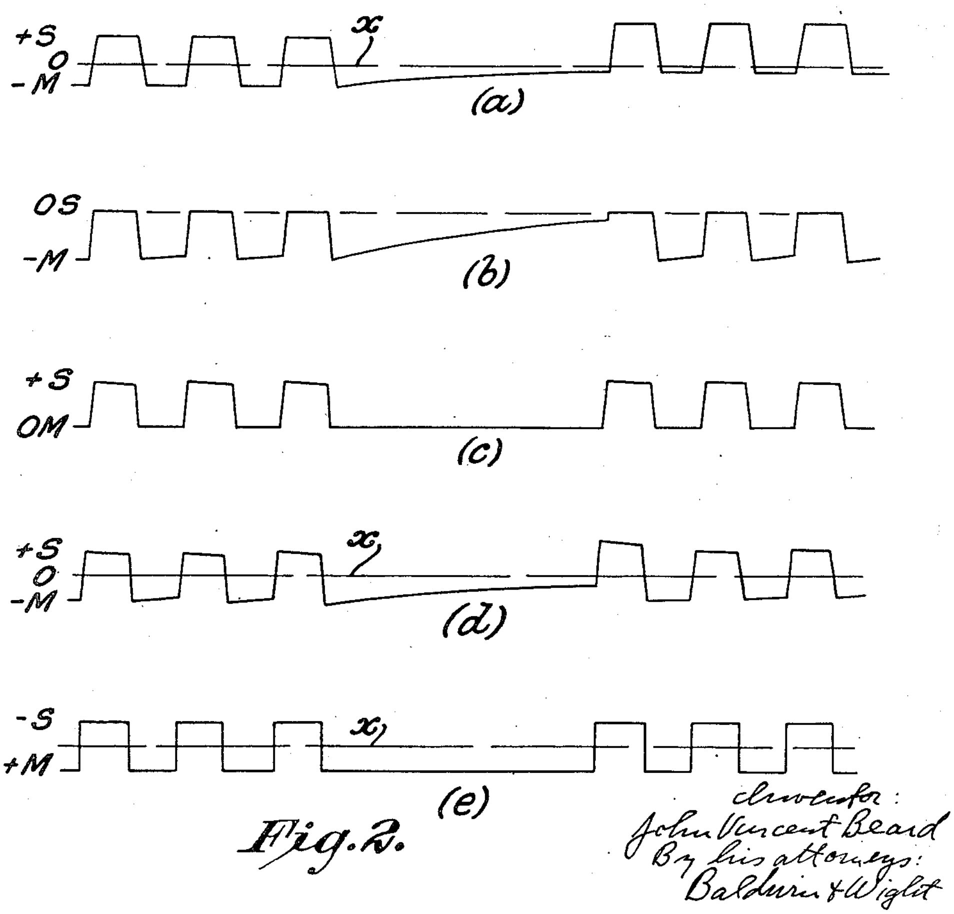
Fig. 2.
Inventor:
John Vincent Beard
By his attorneys:
Baldwin & Wight Dec. 8, 1953

J. V. BEARD 2,662,114

FREQUENCY SHIFT TELEGRAPH RECEIVER

Filed Oct. 8, 1951

2 Sheets-Sheet 2

Inventor:
John Vincent Beard,
By his attorneys:
Baldwin & Wight

Patented Dec. 8, 1953

2,662,114

UNITED STATES PATENT OFFICE 2,662,114

FREQUENCY SHIFT TELEGRAPH RECEIVER

John Vincent Beard, Great Baddow, Chelmsford, England, assignor to Marconi's Wireless Telegraph Company Limited, London, England, a British company Application October 8, 1951, Serial No. 250,341

Claims priority, application Great Britain November 3, 1950

3 Claims. (Cl. 178—66)

Figure 3:
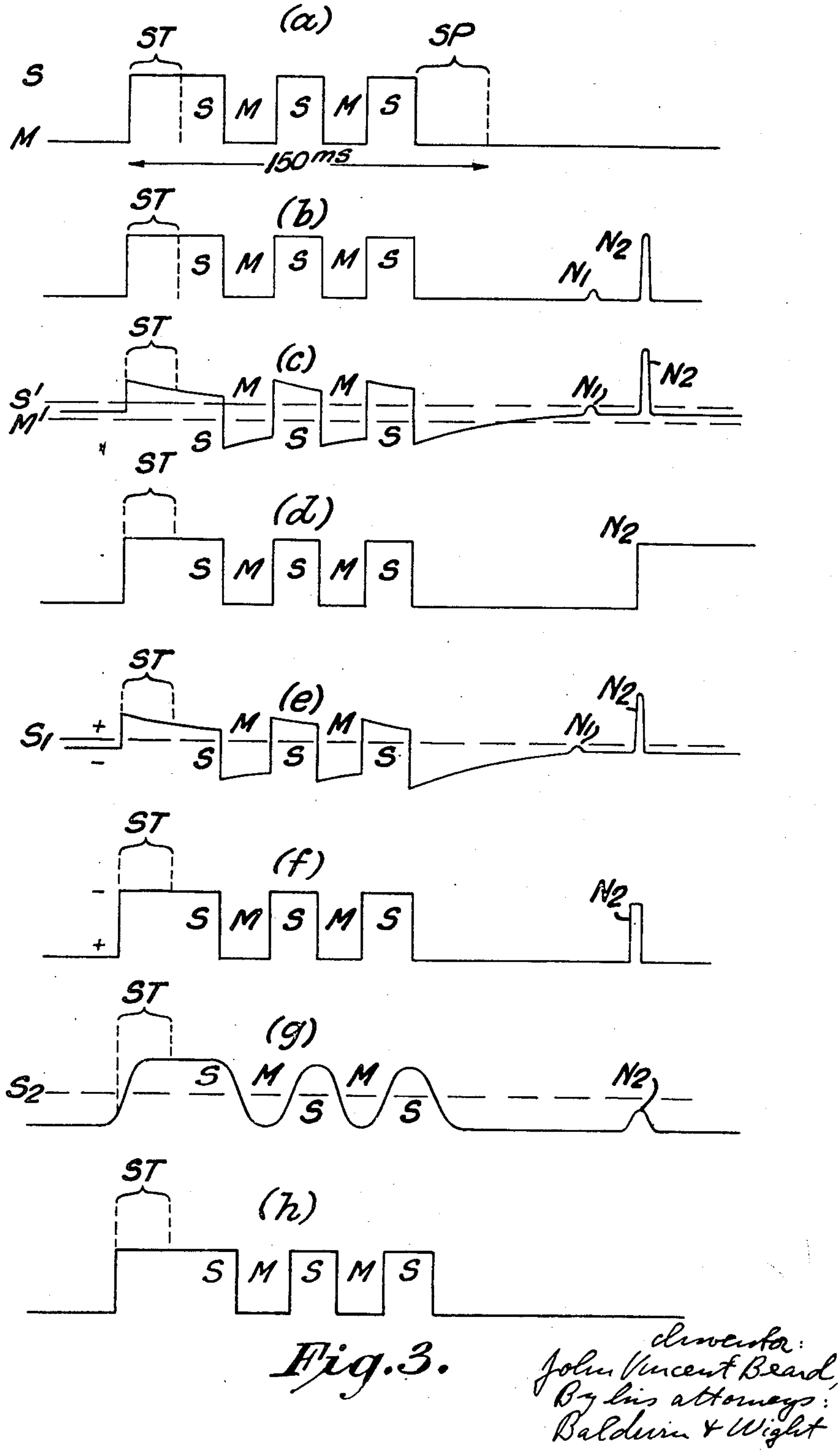

This invention relates to frequency shift telegraph receivers, i. e. to receivers for receiving telegraph signals in which "mark" and "space" are characterized by the use of different frequencies. The invention seeks to provide improved and simple frequency shift telegraph receivers wherein the undesired effects of undesired drifting of transmitted frequencies from their allotted values or the undesired drifting of frequency changing oscillators in the receiver shall be reduced to a minimum and wherein the liability to the creation of spurious signals due to noise or like disturbances in the channel leading to the receiver shall also be reduced to a minimum.

According to this invention the output from the normally provided frequency discriminator of a frequency shift telegraph receiver is fed to a channel including, in the order stated, a D. C. restorer circuit, a limiter circuit, a low pass filter adapted to reduce the amplitude of signals of shorter duration than that of the intelligence conveying signal elements, and a so-called slicer circuit adapted not to respond to signals substantially below the level of the intelligence conveying signal elements at the input to the said slicer circuit.

Preferably the D. C. restorer circuit comprises a pair of rectifiers connected to be conductive respectively to positive and negative impulses and fed each through a condenser from the output of the frequency discriminator, said rectifiers having similar load resistances the mid-point between which is connected to the input terminal of the limiter.

The invention is illustrated in the accompanying drawings in which Figure 1 shows diagrammatically one embodiment thereof. In Fig. 1 typical suitable values are shown alongside the various elements. Figs. 2 and 3 are explanatory graphical figures.

Referring to Fig. 1 output from the normally provided frequency discriminator (not shown) of a frequency shift telegraph receiver is applied at terminals 1. This output may be, in practice, as shown in Fig. 2 (*a*), consisting of a wave form changing between a positive amplitude value representative of "space" and indicated at +S to a negative amplitude value representative of "mark" and indicated at −M. The wave form should be, as shown, in the left hand part of Fig. 2 (*a*) symmetrical about the axis X but if, for example, during an interval between periods of signalling, the transmitter or receiver drifts in frequency, it may become, as shown in the right hand part of Fig. 2 (*a*) badly asymmetrical.

The discriminator output is fed via condensers 2, 3 to the two halves A and B of a double diode V1 connected with load resistances 4, 5 the junction point between which is taken through a resistance 6 to the control grid of a D. C. limiter valve V2. The section A of the valve V1 conducts on positive going impulses and the section B on negative going impulses and accordingly the wave forms at the anodes of the sections A and B will be as represented respectively in Fig. 2 (*b*) and (*c*). The resulting input wave at the control grid of V2 will be practically symmetrical and as shown in Fig. 2 (*d*) despite the frequency drift of the transmitter, for, upon receipt of the first impulse after the interval in which the drift has occurred, the A section of the double diode will conduct and charge condenser 2, restoring symmetry. The wave form at the anode of V2 is as shown in Fig. 2 (*e*) and is completely symmetrical.

Output from the anode of V2 is fed to the control grid of a second D. C. limiter valve V3 whose anode circuit contains a low pass filter generally designated 7. The output from this filter is fed to the control grid of a slicer valve V4 from whose anode output is taken over line 8 to the remainder (not shown) of the receiver which is of normal type.

In order that the operation of the valves V2, V3 and V4 may be the better understood and the way in which spurious interference signals are eliminated may be the better appreciated, consider what happens when a signal upon which noise is superimposed is received. Fig. 3 (*a*) represents in conventional form the telegraph modulation used to key the co-operating transmitter to send the letter R in the well-known Murray 5-unit code. In Fig. 3 (*a*) the letters M and S represent "mark" and "space" as before, the periods ST and SP representing the "start" and "stop" signals respectively. As indicated the whole signal series occupies 150 milliseconds. Fig. 3 (*b*) represents the D. C. output which would be obtained from the frequency discriminator at the receiver if, in radio transmission from transmitter to receiver, two noise impulses $N_1$ and $N_2$ were added, the former being small in amplitude and the latter being of amplitude similar to that of the desired signal. In most receivers as at present in common use a signal such as that of Fig. 3 (*b*) after amplification by a resistance-capacity coupled amplifier would be fed to a trigger or locking circuit adapted to be tripped over to "mark" or "space" by any input signal of the appropriate polarity and of more than a predetermined amplitude. Fig. 3 (*c*) represents the wave form as it would be after passing the resistance-capacity coupling in the amplifier, the broken lines S' and M' representing the amplitude levels beyond which the trigger or locking circuit is tripped over to "space" and "mark" respectively, the vertical spacing between these lines being the "backlash" of the triggering or locking circuit. The output from this circuit would therefore be as represented in Fig. 3 (*d*). The smaller noise pulse $N_1$ has disappeared because it was insufficient to reach the amplitude level represented by the line S' (Fig. 3 (*c*)) but the noise pulse $N_2$ has tripped the circuit to "space" and if, as in the illustrated case, there is a fair interval between the last character of the desired signal and the noise impulse, the apparatus will remain at "space" thus causing the next letter to be missed or incorrectly printed. The circuit of Fig. 1 avoids this defect.

Fig. 3 (*e*) represents the voltage wave form as applied to the control grid of the valve V2 of Fig. 1. This valve has a permanent negative bias (exemplified in Fig. 1 as 4 volts) and has a grid base which is short as compared to the amplitude of the desired signal. Hence the valve V2 "slices" the signal at a level indicated by the broken line $S_1$ in Fig. 3 (*e*) so that the wave form at the anode of V2 is as shown in Fig. 3 (*f*). The small pulse $N_1$ has disappeared but the large one $N_2$ remains. The wave form of Fig. 3 (*f*) is applied to the valve V3 having the low pass filter 7 in its anode circuit. The wave form at the output of the filter will accordingly be as shown in Fig. 3 (*g*), the pulse $N_2$ being greatly reduced owing to its short duration. This wave form is fed to the final valve V4 which is operated as a "slider" valve to "slice" it at the level indicated by the broken line $S_2$. The reduced pulse $N_2$ is too small to reach the "slicing" level and accordingly disappears from the output of the valve V4 this output being, as represented in Fig. 3 (*h*), a correct replica of the original signal.

I claim:

1. In a frequency shift telegraph receiver wherein there is produced, from received signals by means of a frequency discriminator, a wave form changing from a positive amplitude value to a negative amplitude value, one of said values being representative of mark and the other of space, a D. C. restorer circuit, means for applying said wave form to said D. C. restorer circuit to maintain said wave form symmetrical about a constant mean amplitude value, a limiter circuit adapted in response to varying amplitude input signals to provide varying amplitude output signals up to but not exceeding a predetermined maximum amplitude, means for applying the output from said D. C. restorer circuit as input to said limiter circuit, a low pass filter adapted to reduce the amplitude of signals of shorter duration than that of the intelligence conveying signal element and fed from said limiter circuit, and a slicer circuit adapted to be unresponsive to signals substantially below the level of the intelligence conveying signal elements at the input to said slicer circuit and fed from said low pass filter.

2. A frequency shift telegraph receiver as set forth in claim 1 wherein the D. C. restorer circuit comprises a pair of rectifiers connected to be conductive respectively to positive and negative impulses and fed each through a condenser from the output of the frequency discriminator said rectifiers having similar load resistances the mid-point between which is connected to the input terminal of the limiter.

3. A frequency shift telegraph receiver as set forth in claim 1 wherein the D. C. restorer circuit comprises a pair of rectifiers connected to be conductive respectively to positive and negative impulses and fed each through a condenser from the output of the frequency discriminator said rectifiers having similar load resistances the mid-point between which is connected to the input terminal of the limiter, and wherein the restorer circuit rectifiers feed into the grid of a valve whose output is passed to a D. C. limiter valve in turn feeding through a low-pass filter to the grid of a further valve connected to operate as the slicer circuit.

JOHN VINCENT BEARD.

References Cited in the file of this patent

UNITED STATES PATENTS

| Number | Name | Date |
|---|---|---|
| 2,184,978 | Nyquist | Dec. 26, 1939 |
| 2,479,652 | Vilkomerson | Aug. 23, 1949 |